Dec. 19, 1922.

P. F. McMAHON.
INCINERATOR.
FILED FEB. 25, 1922.

WITNESSES

INVENTOR
Patrick F. McMahon
BY
ATTORNEYS

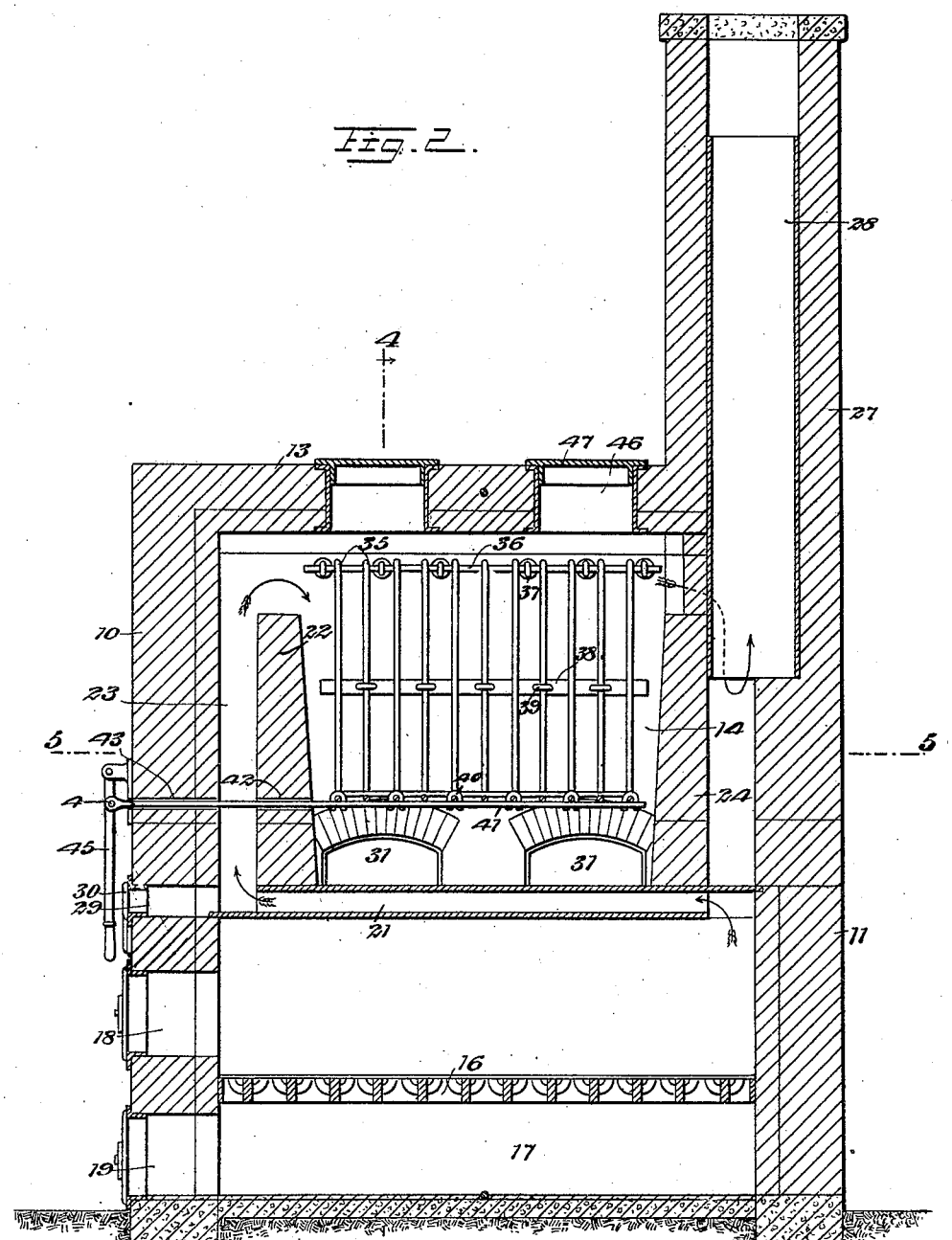

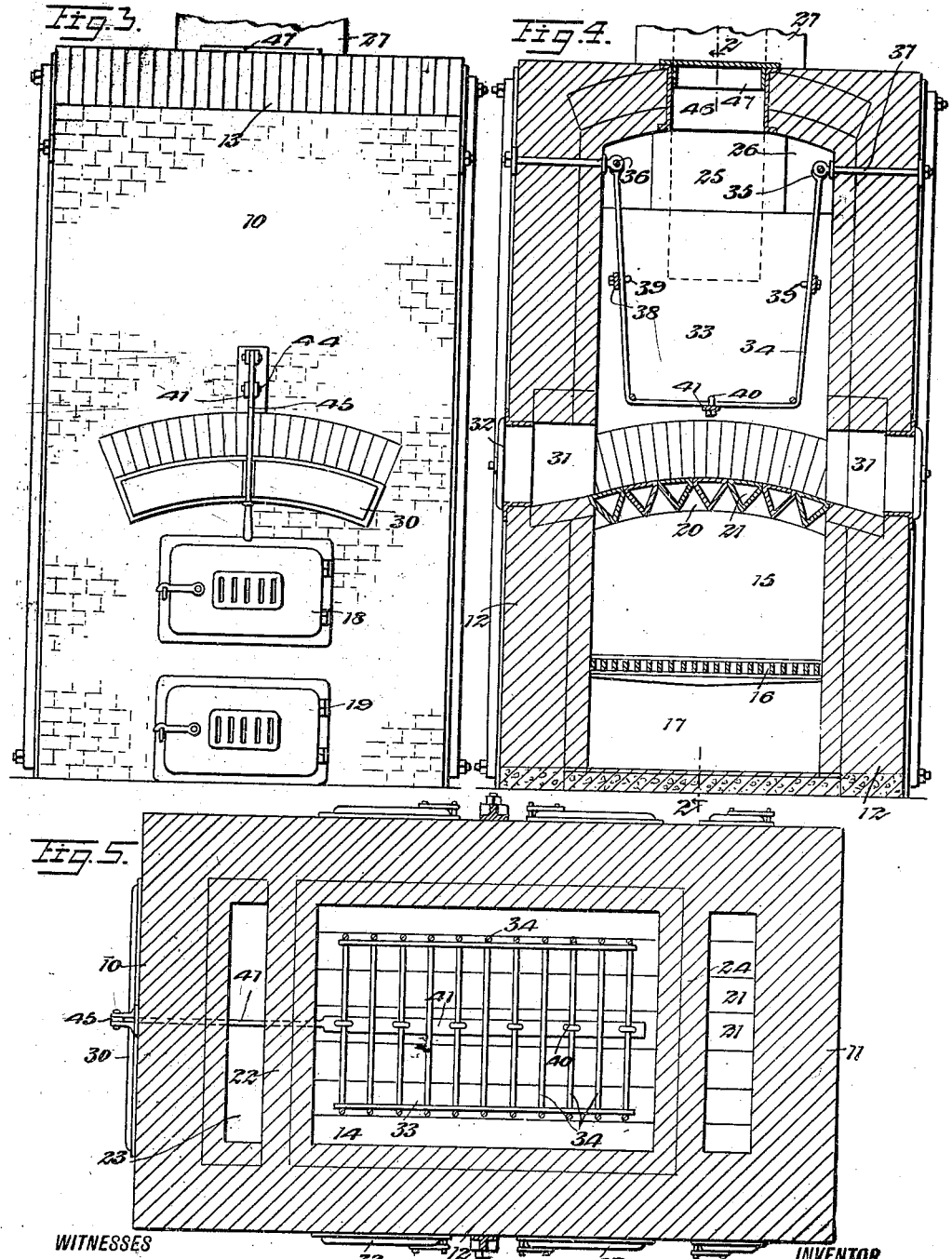

Patented Dec. 19, 1922.

1,439,675

UNITED STATES PATENT OFFICE.

PATRICK FRANCIS McMAHON, OF BETHLEHEM, PENNSYLVANIA.

INCINERATOR.

Application filed February 25, 1922. Serial No. 539,241.

*To all whom it may concern:*

Be it known that I, PATRICK F. McMAHON, a citizen of the United States, and a resident of Bethlehem, in the county of Northampton and State of Pennsylvania, have invented a new and Improved Incinerator, of which the following is a full, clear, and exact description.

This invention relates to furnaces and has particular reference to an improvement in reduction furnaces or incinerators.

The invention broadly contemplates an incinerator which includes a fuel combustion chamber and a superposed reduction chamber with a suspended receiving and supporting means arranged therein to act as a container for the waste matter to be reduced whereby the same may be periodically oscillated to dislodge the ashes and present new layers or strata of the mass to the action of the heat and flame.

Some of the general objects of the present invention reside in the provision of an incinerator which is comparatively simple in its construction; which will effect consumption of the waste matter in a comparatively short space of time, and which will eliminate waste of energy by allowing the moisture and gases to pass off through the draft stack or chimney by the natural draft without attempting to consume the same.

As a further object the invention contemplates means for preheating or drying the waste mass prior to its actual reduction in order to facilitate more rapidly the reducing action.

As a still further object the invention contemplates a novel means for supporting and agitating the waste matter periodically to insure its complete reduction.

Furthermore the invention contemplates as an object a structure which readily admits of repairs at a minimum expenditure.

With the above recited and other objects in view, the invention resides in the novel construction set forth in the following specification, particularly pointed out in the appended claims and illustrated in the accompanying drawings, it being understood that the right is reserved to embodiments other than those actually illustrated herein to the full extent indicated by the general meaning of the terms in which the claims are expressed.

In the drawings—

Fig. 2 is a vertical sectional view therethrough taken approximately on the line 2—2 of Fig. 4.

Fig. 3 is a front elevation thereof.

Fig. 4 is a vertical transverse sectional view taken approximately on the line 4—4 of Fig. 2.

Fig. 5 is a horizontal sectional view taken on the line 5—5 of Fig. 2.

Figure 1:
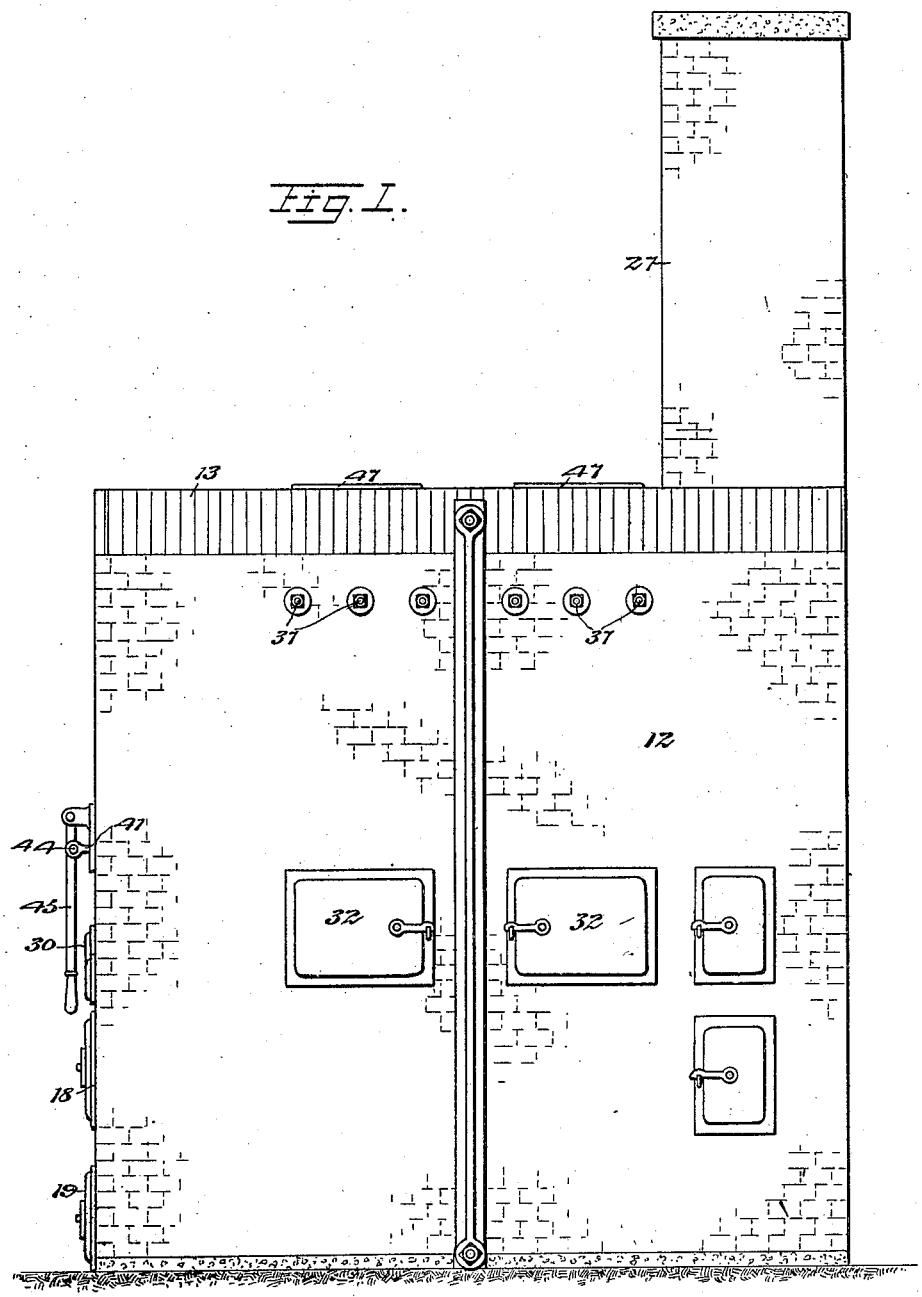
Figure 1 is a side elevation of the incinerator constructed in accordance with the invention.

Referring to the drawings by characters of reference, the furnace which is preferably of rectangular formation is provided with front and rear walls 10 and 11, side walls 12 and a top wall 13. The furnace is divided into an upper reduction chamber 14 and a lower fuel combustion chamber 15, said combustion chamber having mounted therein any suitable type of grate 16 providing therebeneath an ash pit 17. A stoke door 18 is provided in the front wall 10 and communicates with the combustion chamber. A clean-out door 19 is provided in the front wall and communicates with the ash pit. The chambers 14 and 15 are separated by means of a horizontal arcuate wall 20 consisting of a plurality of substantially triangular flue sections 21 extending from the front to the rear wall of the furnace. The upper reduction chamber 14 is provided with a vertical front wall 22 extending from the upper walls of the flue sections to a point below the top wall 13 of the furnace and spaced from the front wall 10 of the furnace providing a vertical flue or passage 23. The flue sections at the rear end communicate with the fuel combustion chamber 15 and at their forward ends communicate with the vertical flue or passage 23. The upper end of the vertical flue or passage 23 communicates with the reduction chamber 14 at its upper forward end. The reduction chamber is provided adjacent the rear wall 11 of the furnace with a vertical wall 24 terminating at its upper end below the top wall 13 and provided with a central reduced section 25 extending upwardly to the top wall to provide at opposite sides draft passages 26. A draft stack or chimney 27 having an inner tubular lining 28 is provided at the rear of the furnace and said lining extends an appreciable distance below the draft passages 26 whereby the draft is forced downwardly upon leaving the reduction chamber. A flue clean-out passage 29 is provided in the front wall in alignment with the flue sections 21 and the same is normally closed by doors 30. The side walls 12 of the furnace are provided with combined clean-out and draft passages 31, which extend therethrough and communicate with the reduction chamber at the lower end thereof, said passages 31 closing at their outer ends by means of doors 32. A receiving and supporting basket for the matter to be reduced, designated generally at 33, is suspended within the reduction chamber. The receiving and supporting basket consists of a plurality of substantially U-shaped rods 34 arranged in spaced longitudinal alignment from front to rear within the reduction chamber, said rods being provided at the upper free ends of their side arms with eyes 35 arranged in alignment. A pair of supporting rods 36 pass through the aligned eyes of the opposite side arms and are supported from the side walls 12 by eyebolts 37. Alternate side arms of the U-shaped rods 34 are connected to the side straps 38 by U-bolts 39, while the free rods are connected by U-bolts 40 to a bottom strap 41 extending centrally beneath the same and protruding forwardly through aligned openings 42 and 43 in the walls 22 and 10. The outer extremity of the bottom strap 41 is pivotally connected as at 44 to a shaking lever 45. By this arrangement movement of the shaking lever 45 will effect oscillations of the free rods 34 relative to the remaining rods 34 which are connected to the side straps 38. The top wall 13 of the furnace is provided with inlet openings 46 normally closed by covers 47 which when removed permit of the filling of the basket with the refuse or waste matter to be reduced.

In use and operation of the incinerator, the refuse or waste matter to be reduced is dumped into the basket 33 through the inlet openings 46 and the covers 47 are then placed thereover. The heat from the fuel combustion chamber 15 will be drawn through the flue sections 21 from the rear of the combustion chamber, thence over the same and beneath the reduction chamber to the front wall of the furnace where it is led upwardly through the vertical flue or draft passage 23 and carried into the reduction chamber 14, thence to the draft passages 26 downwardly into the lower end of the lining 28 and out of the stack. It will thus be seen that during the passage of the heat through the flue sections 21 a part thereof will radiate through the upper walls of the flue sections to the lower end of the reduction chamber at the under side of the basket, while the remainder will be drawn through the vertical flue 23 around the sides of the basket. This action tends to dry out the outer strata or layer of the refuse to a large degree, while the inner strata or layers are gradually dried. After the outer layers or strata have been subjected to the drying action for an appropriate time, the doors 32 of the combined clean-out and draft passages are opened to create a supplemental draft and furnish sufficient oxygen to the reduction chamber to effect the ignition and combustion of the dried out strata or layers. The shaking lever 45 is periodically actuated to oscillate the basket and agitate the mass to cause the ashes to fall onto the dividing wall 20 or upper walls of the flue sections where it can be readily removed through the clean-out passages. In the operation of the incinerator no attempt is made at burning the moisture or gases generated by the drying action as the same are carried off by the natural draft. However, after the furnace has been in operation it will be found that the spaces between the front walls 10 and 22 and the rear walls 11 and 24 will act as retorts to consume the greater portion of the gases generated.

The structure of the basket admits of the removal and renewal of one or more of the elements constituting the same when destroyed or unfit for use, while the sectional formation of the horizontal flue wall 20 permits of the renewal of parts or sections which become burned out or broken.

I claim:

1. In an incinerating furnace, a fuel combustion chamber, a superposed reduction chamber, a draft stack communicating with the latter, a flue leading from the combustion chamber and extending beneath the reduction chamber and having communication with said reduction chamber at its upper end, and means suspended within said reduction chamber for receiving and supporting the waste matter therein.

2. In an incinerating furnace, a fuel combustion chamber, a superposed reduction chamber, a draft stack communicating with the latter, a flue leading from the combustion chamber and extending beneath the reduction chamber and having communication with said reduction chamber at its upper end, and a basket-like receptacle suspended within the reduction chamber for receiving and supporting the waste matter to be reduced.

3. In an incinerating furnace, a fuel combustion chamber, a superposed reduction chamber, a draft stack communicating with the latter, a flue leading from the combustion chamber and extending beneath the reduction chamber and having communication with said reduction chamber at its upper end, a basket-like receptacle suspended within the reduction chamber for receiving and supporting the waste matter to be reduced, and means connected with said receptacle and arranged exteriorly of the furnace for oscillating the basket whereby periodical agitation of the mass may be effected.

4. In an incinerating furnace, a furnace body comprising upper and lower compartments constituting respectively an upper reduction chamber and a lower combustion chamber, a draft stack having communication with the reduction chamber, a horizontal flue extending over the combustion chamber and under the reduction chamber, a vertical flue communicating with the horizontal flue and leading to the upper end of the reduction chamber, and means suspended within the reduction chamber for receiving and supporting the waste matter to be reduced.

5. In an incinerating furnace, a furnace body comprising upper and lower compartments constituting respectively an upper reduction chamber and a lower combustion chamber, a draft stack having communication with the rear end of the reduction chamber, a horizontal flue extending over the combustion chamber and under the reduction chamber, a vertical flue communicating with the forward end of the horizontal flue and leading to the upper end of the reduction chamber, and means suspended within the reduction chamber for receiving and supporting the waste matter to be reduced.

6. In an incinerating furnace, a furnace body comprising upper and lower compartments constituting respectively an upper reduction chamber and a lower combustion chamber, a draft stack having communication with the reduction chamber, a horizontal flue extending over the combustion chamber and under the reduction chamber, a vertical flue communicating with the horizontal flue and leading to the upper end of the reduction chamber, means suspended within the reduction chamber for receiving and supporting the waste matter to be reduced, and actuating means for oscillating said receiving and supporting means whereby to effect periodical dislodgment of the ashes and presentation of the unreduced strata of the waste matter to the action of heat and flame.

7. In an incinerating furnace, a furnace body comprising upper and lower compartments constituting respectively an upper reduction chamber and a lower combustion chamber, a draft stack having communication with the reduction chamber, a horizontal flue extending over the combustion chamber and under the reduction chamber, a vertical flue communicating with the horizontal flue and leading to the upper end of the reduction chamber, combined clean-out and draft doors communicating with the lower end of the reduction chamber, and means suspended within the reduction chamber for receiving and supporting the waste matter to be reduced.

8. In an incinerating furnace, a fuel combustion chamber, a superposed reduction chamber, a communicating flue therebetween and means for receiving and supporting within the reduction chamber the waste matter to be reduced, consisting of a basket-like receptacle comprising a plurality of aligned U-shaped rods supported at their upper ends from opposite sides of said reduction chamber, means connected with alternate rods at the sides thereof for holding the same against movement, and means connected with the lower ends of the remaining U-shaped rods and extending through the front wall of the furnace for actuating the same to effect their oscillation relative to the other rods, as and for the purpose specified.

PATRICK FRANCIS McMAHON.